United States Patent
Caponetti et al.

(10) Patent No.: US 10,612,524 B2
(45) Date of Patent: Apr. 7, 2020

(54) BLADE LOAD SENSING SYSTEM FOR A WIND TURBINE

(71) Applicant: VESTAS WIND SYSTEMS A/S, Aarhus N (DK)

(72) Inventors: Fabio Caponetti, Aarhus C (DK); Aleks Kvartborg Jakobsen, Viby J (DK); Dan Hilton, Gjern (DK); Kasper Zinck Ostergaard, Flemming (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 158 days.

(21) Appl. No.: 15/736,158

(22) PCT Filed: Jun. 17, 2016

(86) PCT No.: PCT/DK2016/050197
§ 371 (c)(1),
(2) Date: Dec. 13, 2017

(87) PCT Pub. No.: WO2017/000947
PCT Pub. Date: Jan. 5, 2017

(65) Prior Publication Data
US 2018/0180029 A1    Jun. 28, 2018

(30) Foreign Application Priority Data
Jun. 30, 2015    (DK) ................................. 2015 70409

(51) Int. Cl.
*F03D 17/00* (2016.01)
*G01L 1/22* (2006.01)
(Continued)

(52) U.S. Cl.
CPC ................ *F03D 17/00* (2016.05); *G01L 1/22* (2013.01); *G01L 5/12* (2013.01);
(Continued)

(58) Field of Classification Search
CPC ............................. F03D 17/00; Y02E 10/721
See application file for complete search history.

(56) References Cited

U.S. PATENT DOCUMENTS

2004/0108732 A1    6/2004  Weitkamp
2009/0129925 A1*   5/2009  Vronsky ............... F03D 1/0658
                                                        416/61
(Continued)

FOREIGN PATENT DOCUMENTS

CN    104318080 A    1/2015
DE    102006041461 A1    3/2008
(Continued)

OTHER PUBLICATIONS

Chinese Office Action for Application No. 201660037921.2 dated Jan. 4, 2019.
(Continued)

*Primary Examiner* — Eric S. McCall
(74) *Attorney, Agent, or Firm* — Patterson + Sheridan, LLP (57) ABSTRACT

A sensor system for a wind turbine blade, the system comprising: a blade load sensor providing a load measurement; a processing unit interfaced with the blade load sensor and configured to provide a corrected load parameter as an output. The processing unit includes: an axial force estimation module that determines an estimated axial force on the wind turbine blade in a direction along the length of the blade; and a load calculation module that 10 determines the corrected load parameter based on the estimated axial force and the load measurement of the blade load sensor.

20 Claims, 5 Drawing Sheets

(51) Int. Cl.
*G01L 5/12* (2006.01)
*G01M 15/14* (2006.01)

(52) U.S. Cl.
CPC ... *F05B 2240/2211* (2013.01); *F05B 2260/80* (2013.01); *F05B 2270/326* (2013.01); *F05B 2270/327* (2013.01); *F05B 2270/329* (2013.01); *F05B 2270/331* (2013.01); *F05B 2270/807* (2013.01); *F05B 2270/808* (2013.01); *G01M 15/14* (2013.01); *Y02E 10/721* (2013.01); *Y02E 10/726* (2013.01)

(56) References Cited

U.S. PATENT DOCUMENTS

| | | | | |
|---|---|---|---|---|
| 2010/0004878 | A1* | 1/2010 | Volanthen | F03D 1/065 702/42 |
| 2011/0110778 | A1* | 5/2011 | Lim | F03D 1/0675 416/61 |
| 2011/0158806 | A1 | 6/2011 | Arms et al. | |
| 2012/0292905 | A1* | 11/2012 | Slot | F03D 1/065 290/44 |
| 2013/0110414 | A1* | 5/2013 | Caponetti | F03G 7/00 702/35 |
| 2013/0177417 | A1 | 7/2013 | Olesen | |
| 2016/0186722 | A1* | 6/2016 | Olesen | F03D 17/00 416/1 |
| 2016/0377058 | A1* | 12/2016 | Caponetti | F03D 7/0224 416/1 |
| 2017/0370350 | A1* | 12/2017 | Olesen | F03D 17/00 |
| 2018/0135601 | A1* | 5/2018 | Caponetti | F03D 17/00 |
| 2018/0156200 | A1* | 6/2018 | Caponetti | G01K 13/00 |
| 2018/0171983 | A1* | 6/2018 | Caponetti | G01K 13/00 |
| 2018/0180030 | A1* | 6/2018 | Thogersen | F03D 1/06 |

FOREIGN PATENT DOCUMENTS

| | | |
|---|---|---|
| EP | 1359321 A1 | 11/2003 |
| EP | 2354538 A1 | 8/2011 |
| EP | 3056726 A1 | 8/2016 |
| WO | 2014044575 A1 | 3/2014 |
| WO | 2017000947 A1 | 1/2017 |

OTHER PUBLICATIONS

Danish Patent and Trademark Office Search Report for Application No. PA 2015 70409 dated Jan. 15, 2016.
International Search Report for Application No. PCT/DK2016/050197 dated Jun. 17, 2016.
PCT Written Opinion of the International Searching Authority for Application No. PCT/DK2016/050197 dated Jun. 17, 2016.

* cited by examiner

BLADE LOAD SENSING SYSTEM FOR A WIND TURBINE

TECHNICAL FIELD

The invention relates to a system and a method for determining the load experienced by a wind turbine blade.

BACKGROUND

The blades of a wind turbine experience loads during operation due to aerodynamic, gravitational and inertial forces. Excessive loads can damage the blades, and also other components of the wind turbine, and so it is important to ensure that the loads experienced by the blades remain within acceptable limits. In order to monitor this, modern wind turbines are usually provided with a blade load sensor system. Such a system typically includes a load sensor provided in each blade to measure the load experienced by that blade. The load sensors are usually provided in the form of a strain gauge and more particularly as an optical strain gauge, for example similar to the one described in EP1230531.

In a known type of blade load sensor system, pairs of load sensors are arranged in a cylindrical root end of the blade and function on a differential basis. An example of such a sensor setup can be found in U.S. Pat. No. 8,157,582. In such a system, typically a pair of load sensors will be located near to the internal leading and trailing edges of the blade, along the chord axis to measure the edge-wise bending moment, and a pair of sensors will be mounded to the blade on the internal leeward and windward blade surface on the flap-wise axis. This is illustrated schematically in FIG. 1, in which a cylindrical root end 2 is overlaid on a blade aerofoil section 4. The pair of flap-wise sensors 6 are positioned diametrically opposite one another and aligned on the flap-wise axis 'F', and the pair of edge-wise sensors 8 are also positioned diametrically opposite one another and are aligned on the edge-wise axis 'E'.

By arranging pairs of sensors aligned on a specific axis, it is possible to determine the difference in the strain measured by each of the sensors, which ensures that inaccuracies due to axial forces acting on the blade can be factored out so that only the bending moment due to flap or edge-wise forces is detected.

However, such load sensor packages can be expensive, difficult to mount, and also problematic to maintain during the lifetime of the wind turbine, so it is desirable to provide an alternative to such load sensor packages, but without sacrificing the accuracy that is achievable with such differential sensor pairs.

SUMMARY OF INVENTION

Against this background, embodiments of the invention provide a sensor system for a wind turbine blade, the system comprising: a blade load sensor providing a load measurement; a processing unit interfaced with the blade load sensor and configured to provide a corrected load parameter as an output, wherein the processing unit includes: an axial force estimation module that determines an estimated axial force on the wind turbine blade in a direction along the length of the blade; and a load calculation module that determines the corrected load parameter based on the estimated axial force and the load measurement of the blade load sensor.

The invention extends to, and also embraces, a method for determining the load on a wind turbine blade, comprising: measuring the blade load using a wind turbine blade load sensor; estimating the axial force acting on the blade along a span-wise axis thereof; and determining, based on the estimated axial force and the measured blade load, a corrected load parameter for the blade.

The invention also resides in a computer program product downloadable from a communication network and/or stored on a machine readable medium, comprising program code instructions for implementing the method as defined above, and also a machine readable medium having stored thereon such a computer program product.

A benefit of the invention is that only a single load sensor is required which makes it a more cost effect and reliable sensor installation. Furthermore, even though only a single sensor is required, the sensor output is still accurate because it compensated for any strain that may be induced by centrifugal or weight effects of the blade as it rotates. Without such compensation, a single sensor system will be susceptible to a gain error base on the azimuth position of the blade and so any wind turbine functions that rely on the load signal provided by the single sensor system will be similarly affected by the error. This may result in inadvertent activation or deactivation of such functions, or increased actuator activity, for example pitch actuator activity in a blade load reduction system.

The axial force estimation module may determine the axial force acting on the blade based on at least one or more of: geometry of the wind turbine; mechanical properties of the blade; azimuth position of the blade, and rotor speed.

Furthermore, the axial force compensation module may determine the axial force acting on the blade by determining i) an axial force contribution based on the weight of the blade at predetermined angular positions and ii) an axial force contribution derived by the centrifugal force acting on the blade as it rotates.

The load sensor may be a strain gauge. This may be located in the root end of the blade and aligned on an axis of the force that it is configured to measure. For example, the sensor may be aligned as close as possible on the flap-wise axis of the blade in order to determine forces or bending moments about that flap-wise axis, and, similarly, the sensor may be aligned as close as possible to the edge-wise axis of the blade in order to determine forces or bending moments about that edge-wise axis.

BRIEF DESCRIPTION OF THE DRAWINGS

In order that the invention may be more readily understood, examples of the invention will now be described with reference to the accompanying figures, in which.

DETAILED DESCRIPTION

Figure 1:
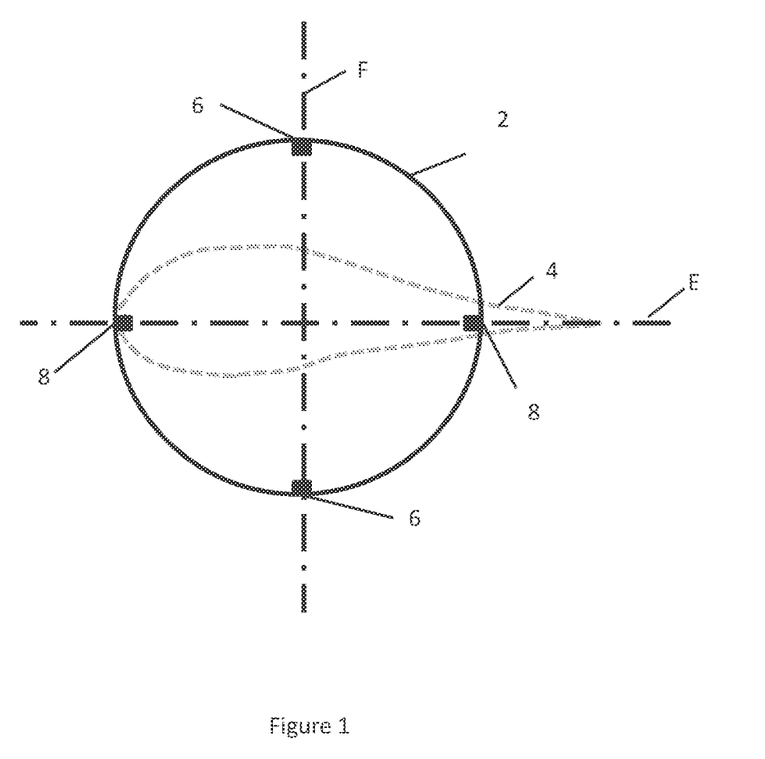
FIG. 1 is a schematic view of a wind turbine blade, viewed from its root end, illustrating load sensor placement in respect to edge-wise and flap-wise axes.
Figure 2:
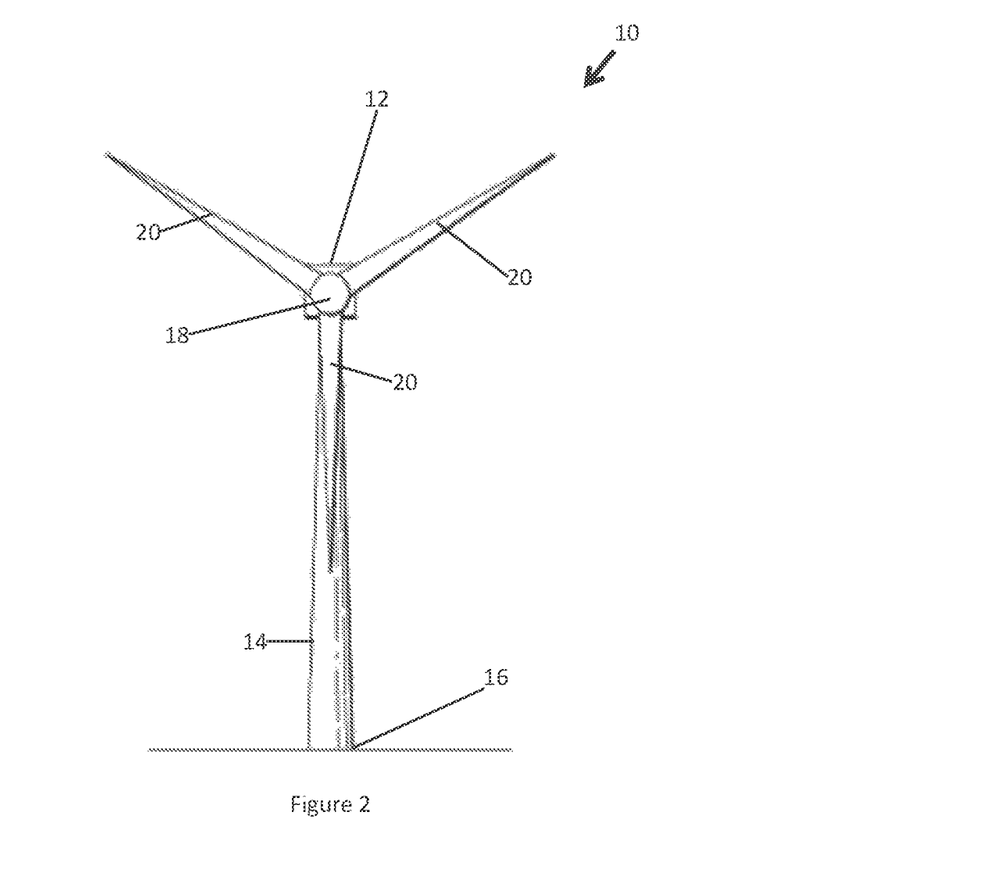
FIG. 2 is a front view of a wind turbine.

Referring to FIG. 2, a wind turbine 10 is shown comprising a nacelle 12 mounted on top of a tower 14 which is fixed into a foundation 16 in the usual manner. The nacelle 12 houses various power generating components of the wind turbine 10 and supports a rotor comprising a hub 18 and three blades 20. The wind turbine installation shown in FIG. 1 is a horizontal axis wind turbine (HAWT) installation which is a common type of system, although other types exist to which the invention is also applicable. As is known, the flow of wind acting on the blades 20 spins the rotor which drives the power generation equipment housed in the nacelle 12.

As discussed above, during operation of the wind turbine 10, the blades 20 experience loads due to aerodynamic, gravitational and inertial forces. In order to monitor these loads, the wind turbine 10 is provided with a blade load sensor system 11 in accordance with an embodiment of the invention, features of which will now be described with reference to FIG. 3.

It should be noted at this stage that the accompanying figures are schematic and have been simplified for the purposes of clarity and to avoid unnecessary detail obscuring the principle form of the invention. In practice, of course, the wind turbine would include many more components. The skilled person will appreciate that additional conventional components would be present in a practical implementation of a wind turbine, and so their presence is implied.

Figure 3:
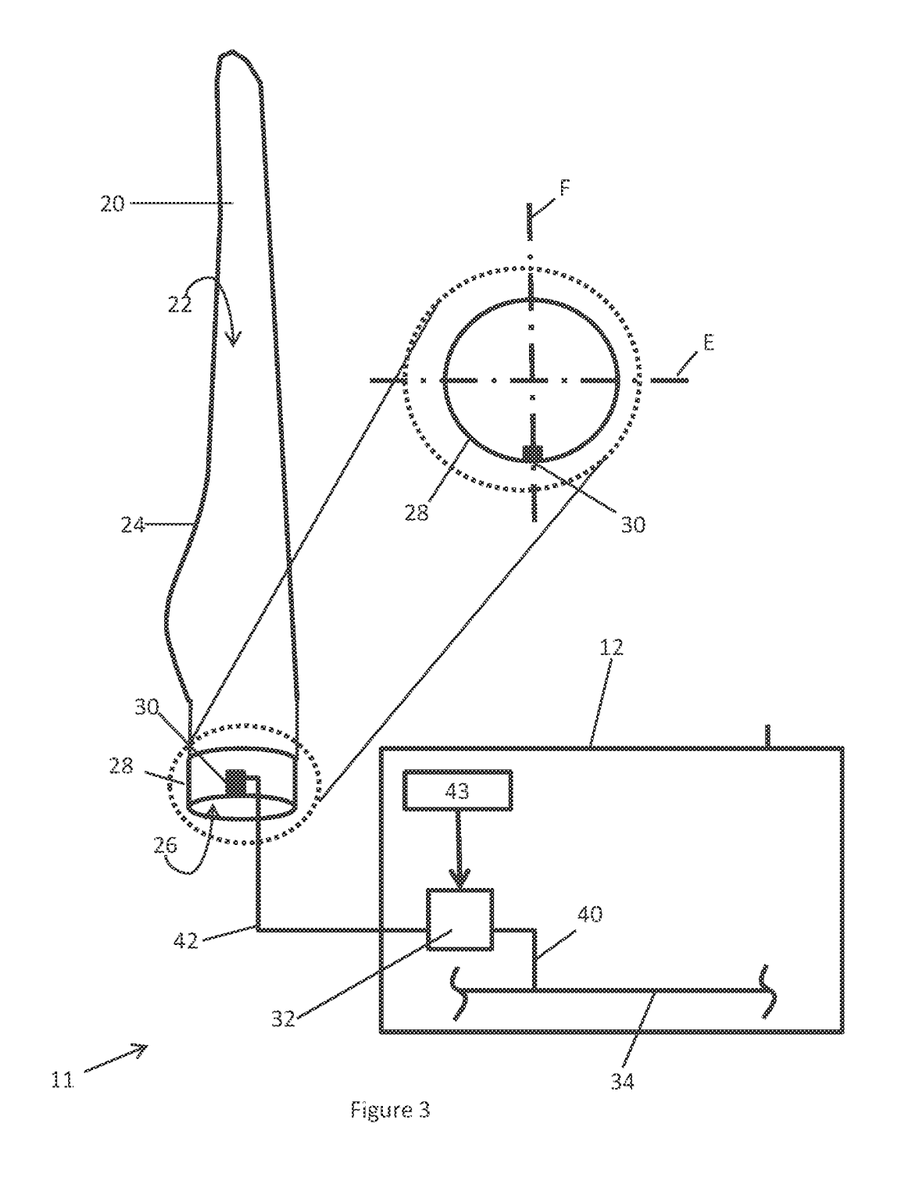
FIG. 3 is a schematic view of a blade load sensor system in accordance with an embodiment of the invention.

In FIG. 3, the blade 20 is shown as having an aerofoil profile 22 provided by an outer shell 24 defining a substantially hollow interior 26. The aerofoil profile 22 of the blade 20 blends into a substantially cylindrical section at its root end 28 where the blade 20 is coupled to the hub 18.

Figures 5, 6:
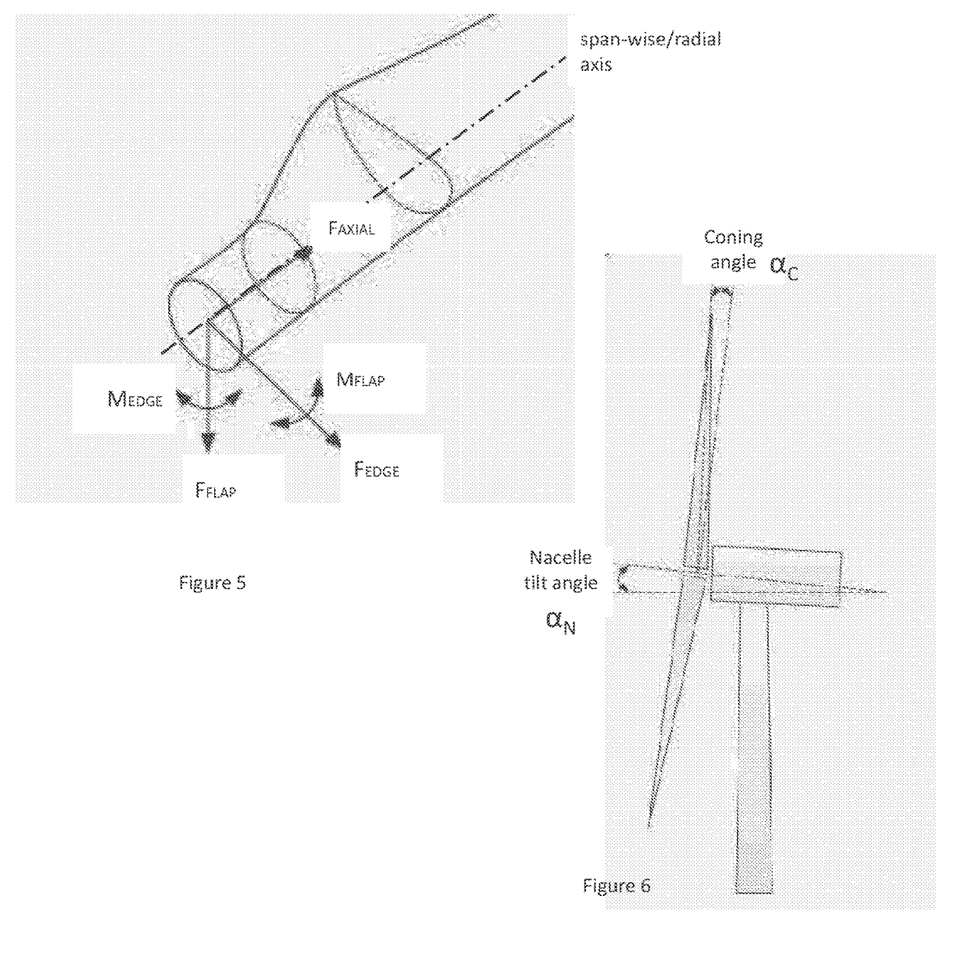
FIG. 5 is a schematic diagram of a wind turbine blade which shows principle forces acting on it.
FIG. 6 is a schematic diagram of a wind turbine illustrating the tilt angle of the nacelle and the coning angle of the blades.

The blade 20 includes a load sensor 30 located near to the root end 28 of the blade 20, and the load sensor 30 is interfaced to a processing unit 32 which, in this embodiment, is shown housed in the nacelle 12, although this need not be the case as it may be located elsewhere in the wind turbine. As can be seen in the inset section in FIG. 3, the load sensor 30 is located at the lower portion of the root end 28 and is aligned on the flap-wise axis F. In this position, the load sensor 30 will function to measure the flap-wise load on the blade with only one sensor instead of a pair of sensors as in the prior art. Note that the flap-wise load and corresponding flap-wise bending moment are illustrated in FIG. 5 as $F_{FLAP}$ and $M_{FLAP}$ respectively. It should be mentioned here that although the load sensor 30 is mounted on the flap-wise axis F in this embodiment, other embodiments may have the load sensor 30 mounted on the edge-wise axis. It should also be noted that it is not essential for the load sensor 30 to be located at the root end of the blade, although a root position is a convenient mounting point. As such, it could be mounted anywhere, as long as the sensor is aligned on the span-wise axis of the blade.

The skilled person will appreciate that the flap-wise load on the blade is a force acting along the flap-wise axis due to the lift and drag generated by the blade. This is detected by the load sensor as a strain along the flap-wise axis which is then converted to load via a gauge factor. However, an axial force (shown as $F_{AXIAL}$ in FIG. 5) arising from the weight of the blade and also the centrifugal force will also induce a stain on the sensor 30 along the span-wise axis of the blade, that is to say the longitudinal axis of the blade that runs in a direction along the length of the blade, from the root to the tip. In a single sensor system as shown here, this mix of forces may cause the sensor reading to misrepresent the actual flap-wise bending moment acting on the blade because the system cannot distinguish the two forces. This may lead to further effects in any functionality that relies on such a signal to operate. For example, a system that acts to reduce blade pitch when excessive flap loads are detected may act prematurely to reduce blade pitch, and this will also have the effect of reducing energy production, thereby reducing the overall generation efficiency of the wind turbine and reducing the lifetime of the actuator.

The embodiments of the invention provide a solution to this issue by determining a value of blade bending moment that is compensated for the strain induced by the axial force acting on the blade. As such the resulting bending moment signal remains substantially unaffected by weight and centrifugal effects of the blade which means that the accuracy of the determined bending moment is more reliable. Furthermore, the embodiment of the invention provide that a single sensor system may be used with acceptably accurate results, which means that the sensor system is more simple in that it has less parts, is more easily mounted inside the blade, and also is more cost effective in relation to a differential sensor system.

Returning to FIG. 2, the role of the processing unit 32 is to receive the load signal from the load sensor 30 and to output a blade load parameter or signal 40 which is compensated for induced axial force generated by the weight of the blade and the centrifugal force, as will be explained hereinafter as 'axial force compensation'. In FIG. 2, the processing unit 32 is shown as connected to a data bus 34 so that any subsystem connected to that data bus 34 may pick off the blade load parameter from it. However, the processing unit 32 may alternatively be configured to output the load parameter directly to any relevant subsystem.

At this point is should be mentioned that only a single blade 20 is shown in FIG. 2, and that in practice the processing unit 32 may receive data input from load sensors from the other blades. Alternatively, a dedicated processing unit could be provided for each blade. Also, although only a single load sensor 30 is shown, it should be appreciated that each blade could be configured with more than one load sensor, depending on the application.

The load sensor 30 is configured to measure the mechanical deformation of the blade 20. Although in this embodiment the sensor 30 is located at or near to the root end 28, it should be noted that in principle the sensor 30 could be mounted in other positions within the blade 20. The load sensor 30 may be bonded to the interior surface of the blade 20 or alternatively, the sensor 30 may be embedded within the structure of the shell 24 or bonded to the exterior surface. An example of a suitable load sensor is an optical strain gauge such as a fibre Bragg grating (FBG) comprising equally spaced reflection points in the core of the optical fibre that reflect difference wavelengths of light under different levels of strain. Such a sensor is well known to the skilled person.

As has been mentioned above, the processing unit 32 is interfaced with the load sensor 30 so as to receive the raw load signal 42 from the load sensor 30 and is configured to perform an axial force compensation function so that the load parameter that is output form the processing unit 32 has improved accuracy. In doing so, the processing unit 32 is arranged to monitor (i.e. receive data signals related to) one or more wind turbine parameters. The one or more wind turbine parameters may include blade angular position and rotor speed. This information may be extracted from the data bus 34, or may be provided by direct sensor input, as is illustrated here in FIG. 3 by sensor input labelled as 43. For this purpose, the wind turbine 10 is provided with various sensors which provide data signals to the processing unit 32. The skilled person will appreciate that the sensors may provide signals to the processing unit 32 via a wired or wireless connection, as appropriate. Typically, such information relating to the angular position and rotor speed may be obtained from rotor telemetry.

Figure 4:
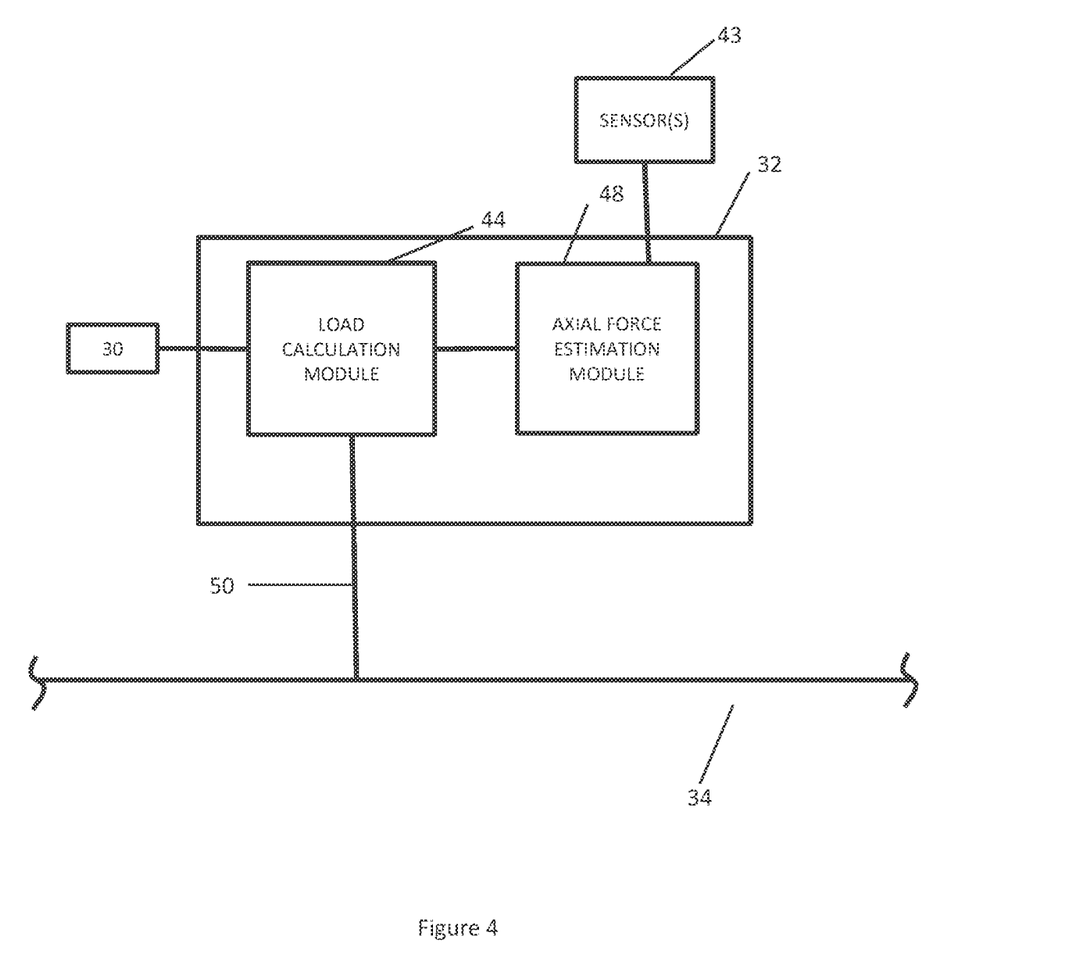
FIG. 4 is a block diagram showing features of the system in more detail.

FIG. 4 shows the processing unit 32 in more detail. As shown, the processing unit 32 includes a load calculation module 44 and an axial force estimation module 48.

The load calculation module 44 calculates the blade load based on two inputs. The first input is the input from the blade load sensor 30 and the second input is from the axial force estimation module 48.

Based on these two inputs, the load calculation module 48 determines the flap-wise load on the blade, more specifically the blade flap-wise bending moment ($M_{BEND}$), that is corrected to as to remove the influence of the axial force acting on the blade due to its own weight and centrifugal effects. Note that the flap-wise force acting on the blade may also be calculated, alternatively or in addition.

The axial force estimation module 48 receives inputs from sensors 43. In this embodiment, the sensors provide information relating to the rotor speed, that is to say the angular velocity of the blade, and also the angular position of the blade.

The function of the axial force estimation module 48 is to determine the estimated axial force induced on the blade, as it rotates, as a function of its position and rotational speed. In this embodiment, the axial force estimation module 48 achieves this by performing an online determination of two factors: the axial force contribution due to gravity (the 'gravity contribution'), and also the centrifugal force contribution (the 'centrifugal contribution') due to the rotational speed of the blade.

The gravity contribution, or $F_G$, may be determined by the following expression:

$$F_G = M_B \times G \times \cos(\alpha_B) \times \cos(\alpha_{N+\cos(\alpha_B)} \times \alpha_C) \quad [1]$$

where:
$F_G$ is the gravity contribution;
$M_B$ is the mass of the blade;
G is the acceleration due to gravity, i.e. 9.81 ms$^{-2}$;
$\alpha_B$ is the azimuth position of the blade, in radians, with respect from a suitable datum position, i.e. zero being straight down;
$\alpha_N$ is the angle of tilt of the nacelle, in radians, with respect to horizontal;
$\alpha_C$ is the blade coning angle in radians, relative to the perpendicular of the tilted nacelle axis.

Note that, for completeness, the angles $\alpha_N$ and $\alpha_D$ are illustrated on FIG. 6.

The centrifugal contribution may be determined by the following expression:

$$F_C = M_B \times CoG_B \times N_R^2 \quad [2]$$

where:
$CoG_B$ is the centre of gravity of the blade, being a length from the blade root; and
$N_R$ is the rotor speed in radians per second.

Finally, the axial force acting on the blade can be determined by the following expression having calculated the gravity contribution and the centrifugal contribution:

$$F_{AXIAL} = F_G + F_C \quad [3]$$

So, as will be appreciated from above, the axial force estimation module 48 determines on a continuous basis a parameter, and therefore outputs a continuous signal accordingly to the load calculation module 44, representing the estimated force acting along the longitudinal axis of the blade.

In turn, the load calculation module 44 functions to determine the flap force on the blade, and therefore also the bending moment, from the strain signal it receives from the blade load sensor, and also the axial force signal it receives from the axial force compensation module 48.

The load calculation module 44 may determine the flap bending moment for the blade by implementing the following expression:

$$M_{FLAP} = \frac{S + O_S - (F_{AX} \times K_{AX})}{K_B} \quad [4]$$

where:
$M_{FLAP}$ is the flap bending moment of the blade;
S is the strain signal from the blade load sensor;
$O_S$ is a sensor calibration offset to correct the strain signal for temperature effects and any inherent and/or installation effects;
$F_{AX}$ is the axial force calculated in equation [3] above;
$K_{AX}$ is an axial force calibration coefficient that, in effect, converts the axial force value into an induced strain value so that it can be validly subtracted from the measured strain signal from the load sensor;
$K_B$ is the bending moment calibration coefficient which, in effect, converts the compensated strain into the desired bending moment value.

Note that the various calibration coefficients mentioned above are derivable using known calibration techniques, for example by holding a rotor stationary with a blade-under-test at a 3 o'clock position, whereby the blade-under-test is pitch throughout its pitch range. The maximum and minimum loads on the blade are therefore known and predictable quantities permitting defined relationships to be defined between raw sensor data and load quantities. Such techniques would be understood by the skilled person, so further explanation will not be given here.

Once the load calculation module has determined the flap-wise bending moment $M_{FLAP}$, it outputs the parameter onto the data bus 34 via output signal 50, although in other embodiments it may be configured to provide the signal directly to selected subsystems of the wind turbine.

From the above discussion, it will be appreciated that the processing unit 32 provides a flap-wise bending moment signal 50, using a single load sensor, which is not influenced by the strain induced on the blade by its weight and also the centrifugal force acting on the blade while it is spinning. A more cost effective sensor system is provided which, moreover, is more readily configured and maintained. Also, it is important to note that a 'standard' single sensor system, having no means to compensate for the axial strain induced on the sensor, would in practice result in flap load signals having a gain error which is a function of the azimuth position of the blade. Any controller that uses that sensor information will inevitably present an error on the controlled output that is also a function of the azimuth position of the blade. One way in which this may manifest is in cyclic pitch control variations in which control actions mitigate the error by pitching each blade independently from the others with a frequency of once per rotor revolution. Compensating for this error will clearly increase wear on the actuator pitch mechanism. Furthermore, any load control functions having activation strategies that rely on the inaccurate flap load signals may trigger at an incorrect time.

The skilled person will appreciate that variations and modification may be made to the specific embodiments described above without departing from the inventive concept as defined by the claims. For example, in the above embodiment, it has been described that the axial force compensation module 48 calculates an axial force value that is sent to the load calculation module 44 for processing. In turn, the load calculation module 44, in effect, converts the axial force value into a value of the equivalent strain induced on the load sensor (strain gauge) 30 so that it can be subtracted from the total measured strain value. In alternative embodiment, however, it is envisaged that the axial force compensation module 48 may output an axial force value, which would then be converted into an equivalent flap-wise bending moment value to be subtracted from a total measured load value. Further, it is envisaged that the axial force compensation module may be configured to calculate a value for an induced flap-wise bending moment based on the estimated axial force, wherein the load calculation module simply subtract the induced bending moment value from the measured total bending moment value.

For example, in the embodiments described above, the load sensor is aligns on a flap-wise axis to detect flap-loads. However, other embodiments are envisaged in which the same principle is applied with a single edge-wise sensor, in which case the same estimated axial force can be used for compensation of the edge-wise bending moments.

The invention claimed is:

1. A sensor system for a wind turbine blade, the sensor system comprising:
   a blade load sensor; and
   a processing unit interfaced with the blade load sensor, wherein the processing unit includes:
      an axial force estimation module configured to determine an estimated axial force along a length of the wind turbine blade, wherein determining the estimated axial force comprises:
         determining a first axial force contribution based on a weight of the wind turbine blade at predetermined angular positions; and
         determining a second axial force contribution based on a centrifugal force acting on the wind turbine blade when rotating; and
      a load calculation module configured to determine a corrected load parameter based on the estimated axial force and a load measurement of the blade load sensor.

2. The sensor system of claim 1, wherein determining the estimated axial force is further based on at least one or more of: a geometry of the wind turbine, mechanical properties of the wind turbine blade, an azimuth position of the wind turbine blade, and a rotor speed.

3. The sensor system of claim 1, wherein the axial force estimation module is further configured to:
   determine an induced flap-wise bending moment based on the estimated axial force.

4. The sensor system of claim 1, wherein the blade load sensor is a strain gauge.

5. The sensor system of claim 1, wherein the axial force estimation module is further configured to:
   determine an induced strain value equivalent to the estimated axial force.

6. The sensor system of claim 5, wherein determining the corrected load parameter is further based on the determined induced strain value and a total measured strain value.

7. A method for determining a load on a wind turbine blade, the method comprising:
   measuring a blade load using a blade load sensor;
   estimating an axial force acting along a length of the wind turbine blade, wherein estimating the axial force comprises:
      determining a first axial force contribution based on a weight of the wind turbine blade at predetermined angular positions; and
      determining a second axial force contribution based on a centrifugal force acting on the wind turbine blade when rotating; and
   determining, based on the estimated axial force and the measured blade load, a corrected load parameter for the wind turbine blade.

8. The method of claim 7, wherein determining the estimated axial force is further based on at least one or more of: a geometry of the wind turbine, mechanical properties of the wind turbine blade, an azimuth position of the wind turbine blade, and a rotor speed.

9. The method of claim 7, further comprising:
   determining an induced blade load value based on the estimated axial force.

10. The method of claim 9, further comprising:
    determining an induced strain value equivalent to the estimated axial force.

11. The method of claim 10, wherein determining the corrected load parameter is further based on the determined induced strain value and a total measured strain value.

12. A computer readable medium containing a program which, when executed by one or more processors, performs an operation for determining a load on a wind turbine blade, the operation comprising:
    measuring a blade load using a blade load sensor;
    estimating an axial force acting along a length of the wind turbine blade, wherein estimating the axial force comprises:
       determining a first axial force contribution based on a weight of the wind turbine blade at predetermined angular positions; and
       determining a second axial force contribution based on a centrifugal force acting on the wind turbine blade when rotating; and
    determining, based on the estimated axial force and the measured blade load, a corrected load parameter for the wind turbine blade.

13. The computer readable medium of claim 12, wherein estimating the axial force is further based on at least one or more of: a geometry of the wind turbine, mechanical properties of the wind turbine blade, an azimuth position of the wind turbine blade, and a rotor speed.

14. The computer readable medium of claim 12, the operation further comprising:
    determining an induced flap-wise bending moment based on the estimated axial force.

15. The computer readable medium of claim 12, the operation further comprising:
    determining an induced strain value equivalent to the estimated axial force.

16. The computer readable medium of claim 15, wherein determining the corrected load parameter is further based on the determined induced strain value and a total measured strain value.

17. A wind turbine comprising:
    a wind turbine blade comprising:
       an aerodynamic body having a root end and a tip;
       a blade load sensor disposed on the aerodynamic body; and
    a processing unit interfaced with the blade load sensor, wherein the processing unit is configured to:

determine an estimated axial force along a length of the aerodynamic body, wherein estimating the axial force comprises:
  determining a first axial force contribution based on a weight of the wind turbine blade at predetermined angular positions; and
  determining a second axial force contribution based on a centrifugal force acting on the wind turbine blade when rotating; and
determine a corrected load parameter based on the estimated axial force and a load measurement of the blade load sensor.

18. The wind turbine of claim 17, wherein the blade load sensor is disposed at the root end of the aerodynamic body.

19. The wind turbine of claim 17, wherein the blade load sensor is a strain gauge.

20. The wind turbine of claim 17, wherein the processing unit comprises:
  an axial force estimation module configured to determine the estimated axial force; and
  a load calculation module configured to determine the corrected load parameter.

\* \* \* \* \*